United States Patent
Haag et al.

(10) Patent No.: US 10,627,275 B2
(45) Date of Patent: Apr. 21, 2020

(54) SENSOR FOR DETERMINING AT LEAST ONE PARAMETER OF A FLUID MEDIUM FLOWING THROUGH A MEASURING CHANNEL

(71) Applicant: Robert Bosch GmbH, Stuttgart (DE)

(72) Inventors: Axel-Werner Haag, Stuttgart (DE); Edda Sommer, Stuttgart (DE); Hans Beyrich, Freiberg (DE); Reinhold Herrmann, Stuttgart (DE); Uwe Konzelmann, Asperg (DE); Alexander Markov, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 177 days.

(21) Appl. No.: 15/566,119

(22) PCT Filed: Feb. 25, 2016

(86) PCT No.: PCT/EP2016/053938
§ 371 (c)(1),
(2) Date: Oct. 12, 2017

(87) PCT Pub. No.: WO2016/165866
PCT Pub. Date: Oct. 20, 2016

(65) Prior Publication Data
US 2018/0087944 A1 Mar. 29, 2018

(30) Foreign Application Priority Data
Apr. 14, 2015 (DE) .................. 10 2015 206 677

(51) Int. Cl.
*G01F 1/684* (2006.01)
*H01F 5/00* (2006.01)
(Continued)

(52) U.S. Cl.
CPC .............. *G01F 1/6847* (2013.01); *G01F 1/68* (2013.01); *G01F 1/6842* (2013.01); *G01F 5/00* (2013.01);
(Continued)

(58) Field of Classification Search
CPC ........ G01F 1/6847; G01F 1/68; G01F 1/6842; G01F 5/00; F02D 41/18; F02M 35/10386
(Continued)

(56) References Cited

U.S. PATENT DOCUMENTS 5,631,416 A    5/1997  Rilling et al.
6,299,469 B1  10/2001  Glovatsky et al.
(Continued)

FOREIGN PATENT DOCUMENTS

CN    1386190 A    12/2002
CN  102252719 A    11/2011
(Continued)

OTHER PUBLICATIONS

International Search Report dated Jun. 7, 2016, of the corresponding International Application PCT/EP2016/053938 filed Feb. 25, 2016.
(Continued)

*Primary Examiner* — Daniel S Larkin
(74) *Attorney, Agent, or Firm* — Norton Rose Fulbright US LLP; Gerard Messina

(57) ABSTRACT

A sensor for determining at least one parameter of a fluid medium, in particular an intake air mass flow of an internal combustion engine, flowing through a measuring channel is provided. The sensor includes a sensor housing, in particular a plug-in sensor that is introduced or introducible into a flow tube and in which the measuring channel is formed, and at least one sensor chip situated in the measuring channel for determining the parameter of the fluid medium. The sensor housing includes an electronics compartment for accommo-
(Continued)

dating an electronic module, and an electronics compartment cover for closing the electronics compartment. The electronics compartment cover has electrically conductive properties at least in part. The electronic module is electrically conductively connected to an interior of the electronics compartment cover.

8 Claims, 5 Drawing Sheets

(51) Int. Cl.
  *G01F 1/68* (2006.01)
  *G01F 5/00* (2006.01)
  *F02D 41/18* (2006.01)
  *F02M 35/10* (2006.01)

(52) U.S. Cl.
  CPC ....... *F02D 41/18* (2013.01); *F02M 35/10386* (2013.01)

(58) Field of Classification Search
  USPC .............................. 73/204.22, 114.32, 114.34
  See application file for complete search history.

(56) References Cited

U.S. PATENT DOCUMENTS

| | | | |
|---|---|---|---|
| 2008/0264165 A1* | 10/2008 | Abe | H01L 25/165 73/204.22 |
| 2012/0048005 A1 | 3/2012 | Renninger et al. | |
| 2013/0269419 A1* | 10/2013 | Etherington | G01F 1/692 73/37 |
| 2015/0040653 A1 | 2/2015 | Konzelmann et al. | |

FOREIGN PATENT DOCUMENTS

| | | |
|---|---|---|
| CN | 103429155 A | 12/2013 |
| CN | 103501845 A | 1/2014 |
| DE | 102010020264 A1 | 12/2011 |
| DE | 102013212162 A1 | 12/2014 |
| EP | 2339311 A1 | 6/2011 |
| JP | 2003194607 A | 7/2003 |

OTHER PUBLICATIONS

Konrad Reif (publisher): Sensoren im Kraftfahrzeug [Sensors in the Motor Vehicles], Edition 1, 2010, pp. 146-148.

\* cited by examiner

SENSOR FOR DETERMINING AT LEAST ONE PARAMETER OF A FLUID MEDIUM FLOWING THROUGH A MEASURING CHANNEL

BACKGROUND INFORMATION

Numerous conventional methods and devices are available for determining at least one flow property of fluid media, i.e., liquids and/or gases. The flow properties as possible parameters may be any given physically and/or chemically measurable properties which qualify or quantify a flow of the fluid medium. In particular, a flow speed and/or a mass flow and/or a volume flow may be involved.

The present invention is described below in particular with reference to so-called hot film air mass flow meters, as described, for example, in Konrad Reif (publisher): Sensoren im Kraftfahrzeug (Sensors in Motor Vehicles), Edition 1, 2010, pages 146-148. These types of hot film air mass flow meters are generally based on a sensor chip, in particular a silicon sensor chip, for example with a sensor diaphragm as a measuring surface or sensor area over which the flowing fluid medium may flow. The sensor chip generally includes at least one heating element and at least two temperature sensors that are situated, for example, on the measuring surface of the sensor chip, one temperature sensor being mounted upstream from the heating element and the other temperature sensor being mounted downstream from the heating element. A mass flow and/or volume flow of the fluid medium may be deduced based on an asymmetry of the temperature profile detected by the temperature sensors, which is influenced by the flow of the fluid medium.

Hot film air mass flow meters are usually designed as plug-in sensors which are permanently or replaceably introducible into a flow tube. For example, this flow tube may be an intake tract of an internal combustion engine.

A partial flow of the medium flows through at least one main channel provided in the hot film air mass flow meter. A bypass channel is provided between the inlet and the outlet of the main channel. In particular, the bypass channel is designed in such a way that it has a curved section for deflecting the partial flow of the medium which has entered through the inlet of the main channel, the further course of the curved section merging into a section in which a sensor chip is situated. The latter-mentioned section represents the actual measuring channel in which the sensor chip is situated.

In conventional hot film air mass flow meters, a sensor carrier with the sensor chip mounted thereon or inserted therein generally protrudes into the measuring channel. For example, the sensor chip may be glued into or onto the sensor carrier. The sensor carrier may form a unit with, for example, a base plate made of metal on which an electronics system and a control and evaluation circuit (for example, with a circuit carrier, in particular a circuit board) may be glued. For example, the sensor carrier may be designed as a molded-on plastic part of an electronic module. The sensor chip and the control and evaluation circuit may be connected to one another via bond connections, for example. The electronic module produced in this way may, for example, be glued into a sensor housing, and the entire plug-in sensor may be closed by covers.

In practice, these types of hot film air mass flow meters must meet numerous requirements. In addition to the aim of reducing an overall pressure drop at the hot film air mass flow meter with the aid of suitable flow designs, one of the main challenges is to further improve the signal quality as well as the robustness of the devices with respect to contamination by oil and water droplets, as well as soot, dust, and other solid particles. This signal quality relates, for example, to a mass flow of the medium through the measuring channel leading to the sensor chip, and optionally to the reduction of a signal drift and the improvement of the signal-to-noise ratio. The signal drift relates to the deviation, for example of the mass flow of the medium, in the sense of changing the characteristic curve relationship between the mass flow actually occurring and the signal to be emitted within the scope of calibration during manufacture. For ascertaining the signal-to-noise ratio, the sensor signals which are output in a rapid time sequence are taken into account, whereas the characteristic curve drift or signal drift refers to a change in the mean value.

German Patent Application No. DE 10 2013 212 162 A1 describes a sensor device for detecting at least one property of a fluid medium flowing in a channel. The sensor device is introduced into a channel piece, including an inlet and an outlet, through which a fluid medium may flow. To counteract an accumulation of charged particles on the sensor element of the sensor, it is provided that the entire wall of the channel piece is made completely of an electrically conductive plastic, the channel piece wall being at a fixed electrical potential.

Despite the numerous advantages of the conventional sensors and methods for avoiding the contamination of the sensor element by dust particles, for example, they are still capable of improvement. In the future, however, an increased limitation of the required service life tolerance, i.e., more stringent regulations on the one hand, and new fields of application due to expansion of the applicability of existing regulations on the other hand, may require the use of conductive plastics, and in particular electrical contacting of same.

SUMMARY

In accordance with an example embodiment of the present invention, a sensor for determining at least one parameter of a fluid medium flowing through a measuring channel is provided, which may at least largely avoid the disadvantages of known sensors, and which in particular allows a reduction or avoidance of dust contamination of the micromechanical sensor diaphragm, of the sensor chip, and of the sensor carrier, and thus a reduction of characteristic curve drift, in particular over the service life, in particular due to an accumulation of dust particles on the surface of the mentioned components, allows improved electromagnetic compatibility, i.e., reduced sensitivity of the electrical and electronic signal processing to irradiated electromagnetic interferences, and allows improved protection against electrostatic discharges into the circuit by controlled dissipation of the charge.

A sensor according to the present invention for determining at least one parameter of a fluid medium, in particular an intake air mass flow of an internal combustion engine, flowing through a measuring channel includes a sensor housing, in particular a plug-in sensor that is introduced or introducible into a flow tube and in which the measuring channel is formed, and at least one sensor chip situated in the measuring channel for determining the parameter of the fluid medium, the sensor housing including an electronics compartment for accommodating an electronic module, and an electronics compartment cover for closing the electronics compartment. The electronics compartment cover has electrically conductive properties at least in part, the electronic module being electrically conductively connected to an interior of the electronics compartment cover.

Within the scope of the present invention, an electrically conductive connection of the electronic module to an interior of the electronics compartment cover is understood to mean that the electronic module is electrically conductively connected to at least one area of the electronics compartment cover situated in the interior of the electronics compartment cover. The interior of the electronics compartment cover is the volume encompassed by the outer surfaces of the electronics compartment cover. If the electronics compartment cover is, for example, made of plastic, as customary, with the aid of an injection molding process, within the scope of the injection molding process a so-called injection-molded skin forms on the outer surface of the electronics compartment cover, beneath which the plastic is initially soft until it cools. An electrically conductive connection to the interior of the electronics compartment cover may now take place by scoring or peeling off the injection-molded skin. Thus, the electrically conductive connection to the interior of the electronics compartment cover may be established by intentionally scoring or peeling off the injection-molded skin during assembly of the electronics compartment cover on the sensor housing. The peeling off may also be an integral part of the injection molding process.

The electronic module may include a base plate. The base plate may be electrically conductively connected to the interior of the electronics compartment cover. For example, during assembly of the electronics compartment cover on the sensor housing, the surface, i.e., injection-molded skin, of the electronics compartment cover is intentionally scored or peeled off with the aid of a punching edge of the base plate. The base plate may be set at a fixed potential. The base plate may be connected to the fixed potential with the aid of an electrically conductive adhesive or with the aid of wire bonding. The electrical potential is preferably provided by voltage-carrying elements of the electronic module. For example, the fixed potential is the sensor mass.

The base plate may be connected to the interior of the electronics compartment cover, combined with an at least partial material removal of a surface of the electronics compartment cover. Within the scope of the present invention, a material removal of a surface of the electronics compartment cover is understood to mean a superficial removal of material of the electronics compartment cover. For example, the surface may be intentionally scored or peeled off by scoring or peeling off during assembly of the electronics compartment cover on the sensor housing. In this context, "superficial" is understood to mean a material thickness of no greater than 1 mm.

The electronic module may include a contact pin that is electrically conductively connected to the interior of the electronics compartment cover. The electronics compartment cover may have a projection. The electronic module may be electrically conductively connected to an interior of the projection. The electronics compartment cover may include in its interior an insert component made of an electrically conductive material. The insert component may be electrically conductively connected to the electronic module. The insert component may be made of metal. The insert component may be electrically conductively connected to the electronic module with the aid of an elastic contact.

Within the scope of the present invention, an insert component is understood to mean a component that is completely enclosed by the material of the electronics compartment cover during manufacture of the electronics compartment cover. For example, the insert component is placed in a casting mold and then encapsulated with the material of the electronics compartment cover. This may be achieved in particular within the scope of an injection molding process, using plastic.

Within the scope of the present invention, the main flow direction is understood to mean the local flow direction of the fluid medium at the location of the sensor or the sensor system, it being possible to disregard, for example, local irregularities such as turbulences. In particular, the main flow direction may thus be understood to mean the local averaged transport direction of the flowing fluid medium. Thus, the main flow direction may be based on the one hand on the flow direction at the location of the sensor system itself, or on the other hand, on the flow direction in the channel within the sensor housing, for example at the location of the sensor carrier or of the sensor chip; a distinction may be made between the two mentioned main flow directions. Within the scope of the present invention, the particular location to which the main flow direction refers is therefore always stated. In the absence of more detailed information, the main flow direction refers to the location of the sensor system.

Within the scope of the present invention, the sensor carrier may be completely or partially designed as a circuit carrier, in particular as a circuit board, or may be part of a circuit carrier, in particular a circuit board. For example, the circuit carrier, in particular the circuit board, may have an extension which forms the sensor carrier and protrudes into the channel, for example the measuring channel of a hot film air mass flow meter. The remaining portion of the circuit carrier, in particular the circuit board, may be accommodated, for example, in an electronics compartment, or in a housing of the sensor system or of a plug-in sensor of the sensor system.

Within the scope of the present invention, a circuit board is generally understood to mean an essentially plate-shaped element which may also be used as a support for electronic structures, for example circuit board conductors, terminal contacts, or the like, and which preferably also includes one or more of these types of structures. In principle, at least slight deviations from the plate shape are also considered, and conceptually are included with same. The circuit board may be made, for example, of a plastic material and/or a ceramic material, an epoxy resin, for example, in particular a fiber-reinforced epoxy resin. In particular, the circuit board may be designed, for example, as a circuit board having circuit board conductors, in particular printed circuit board (PCB) conductors.

In this way, the electronic module of the sensor system may be greatly simplified, and a base plate and a separate sensor carrier, for example, may be dispensed with. The base plate and sensor carrier may be replaced by a single circuit board on which, for example, a control and evaluation circuit of the sensor system may also be completely or partially situated. This control and evaluation circuit of the sensor system is used to control the at least one sensor chip and/or the evaluation of the signals generated by this sensor chip. Thus, by combining the mentioned elements, the complexity of manufacturing the sensor system may be significantly reduced, and the space requirement for the electronic module may be greatly reduced.

The sensor system may in particular include at least one housing, the channel being provided in the housing or in the housing cover. For example, the channel may include a main channel and a bypass channel or measuring channel, it being possible for the sensor carrier and the sensor chip to be situated in the bypass channel or measuring channel, for example. In addition, the housing may have an electronics compartment that is separate from the bypass channel, the electronic module or the circuit board essentially being accommodated in the electronics compartment. The sensor carrier may then be designed as an extension of the circuit board which protrudes into the channel. In contrast to the conventional complicated electronic modules, this system is comparatively easy to implement technically.

In particular in the case in which a circuit board is used as the sensor carrier, but also in other cases and/or when other media are used as the sensor carrier, the sensor carrier may be designed, at least partially, as a multilayer sensor carrier. Thus, the sensor carrier may be designed in a so-called multilayer technique, and have two or more carrier layers joined together. For example, these carrier layers may once again be made of a metal, a plastic, or a ceramic material or a composite material, and joined together using joining techniques, for example gluing.

In this case, in which a multilayer technique is used with multiple sensor layers of the sensor carrier, the leading edge may have an at least partially stepped design against the main flow direction of the fluid medium as the result of different dimensioning of the carrier layers. The profiles may thus be implemented in at least an approximately stepped manner. For example, profiles in a section plane perpendicular to the extension plane of the sensor carrier may thus be provided with a shape that is rectangular or, approximated by a stepped shape, at least approximately circular, rounded, or wedge-shaped. The sensor chip may be situated on or in the sensor carrier in such a way that it is oriented perpendicularly with respect to the local main flow direction. For example, the sensor chip may have a rectangular design, one side of this rectangle being perpendicular or essentially perpendicular, for example with an orientation that deviates by no more than 10 degrees from the vertical with respect to the local main flow direction.

The sensor chip may be electrically contacted via at least one electrical connection. For example, the sensor carrier, in particular a circuit board which forms the sensor carrier or an extension of this circuit board, may include one or multiple strip conductors and/or contact pads which are connected to corresponding contacts on the sensor chip, for example with the aid of a bonding process. In this case, the electrical connection may be protected by at least one cover and be separated from the fluid medium. This cover may in particular be designed as a so-called "glob top," for example as plastic drops and/or adhesive drops, which covers the electrical connection, for example the bond wires. In particular, influences on the flow by the electrical connection may also be avoided in this way, since the glob top has a smooth surface.

In addition, the sensor chip may include at least one sensor area. This sensor area may be, for example, a sensor surface made, for example, of a porous ceramic material, and/or in particular may be a sensor diaphragm. The flowing fluid medium may flow over the sensor diaphragm as a measuring surface or sensor area. The sensor chip includes, for example, at least one heating element and at least two temperature sensors that are situated, for example, on the measuring surface of the sensor chip, one temperature sensor being mounted upstream from the heating element and the other temperature sensor being mounted downstream from the heating element. A mass flow and/or volume flow of the fluid medium may be deduced based on an asymmetry of the temperature profile detected by the temperature sensors, which is influenced by the flow of the fluid medium.

Within the scope of the present invention, an incident flow section of the sensor carrier is understood to mean that section of the sensor carrier situated upstream from the sensor chip.

A basic concept of the present invention is to establish reliable electrical contacting of an electronic module with a cover, for example an electronics compartment cover, that has electrically conductive properties. It is thus possible to manufacture sensors which are much more robust against soiling than previously known sensors, and which at the same time meet the stringent cost objectives of large-scale production.

In one specific embodiment of the present invention, the electronics compartment cover to be contacted is made of electrically conductive plastic, and is already provided with a hole during the injection molding process, with the aid of a support pin. During the joining process, a projecting or protruding contact pin which is made of an electrically conductive material, for example metal, and which is electrically conductively connected to the electronic module, cuts into the previously provided hole in the electronics compartment cover. The diameters are dimensioned in such a way that the diameter of the pin is greater than or equal to the diameter of the hole. This ensures that the metallic contact pin scores the injection-molded skin of the plastic part and thus establishes a contact having preferably low electrical contact resistance.

In another specific embodiment of the present invention, the electronics compartment cover is thickened in the area of the cutting connection described above, on the one hand to achieve a larger contact surface (circumferential surface), and on the other hand to ensure a termination of the contact pin that is aligned with the mounted electronics compartment cover. Hermetic seal-tightness is optionally effectuated by a subsequent localized heating process or gluing process. However, depending on the design of the hole, this is not even necessary if the hole is designed as a cone and is therefore closed toward the outside, i.e., away from the electronics compartment. However, seal-tightness is often also not necessary or is explicitly not wanted, in order to allow the enclosed air to escape during the joining process. A hot film air mass flow meter typically has such a vent hole, which may be dispensed with in the implementation of the present invention, resulting in greater seal-tightness of the overall electronics compartment, with or without the additional sealing process mentioned above.

In another advantageous specific embodiment of the present invention, an electrical contact is established outside the sensor housing to allow further components, such as a cylinder housing or other surrounding structures, to be brought to a defined potential. This contact may be provided either directly between the plastic joining part and the conductor comb, with a portion of the conductor comb appropriately formed and bent, or, as in a conventional hot film air mass flow meter, between the plastic joining part and the metallic base plate. Multiple cutting contacts may also be provided for symmetry and load distribution reasons.

Within the scope of the present invention, in particular two contact points may be provided: a joining part, in the form of the electronics compartment cover made of conductive plastic, to the metal press-in part, and a metal press-in part to the ground pin of the conductor comb. The joining part to be contacted, made of conductive plastic, includes a tab, for example, that is contacted on the metal part via a crimp connection. One or multiple, for example four, such contacts is/are provided. An additional contact point achieves the via to the plug pin.

In another specific embodiment of the present invention, the joining part includes a tab in the area of the contact point, which is contacted on the metal part via a crimp connection. To achieve a defined, preferably low-impedance electrical resistance, it is advantageous to score the injection-molded skin of the plastic part. This may be achieved by locally peeling off the plastic surface by the sharp punching edge of the metal sheet during the joining process. However, it is also conceivable for a peeling-off operation at a defined location to be an integral part of the plastic injection molding process. In addition, a metal insert may be provided in the electronics compartment cover. This metal insert in the electronics compartment cover on the one hand forms the contact with the plastic cover made of electrically conductive material, and on the other hand may establish a resilient metal-metal contact with the installed circuit board. This resilient contact may be installed vertically, but preferably horizontally.

The via to the plug pin may be established by a glued connection or a thick wire bond connection to a ground contact of the circuit board. The structure is designed in such a way that the press-in forces necessary for the assembly are appropriately distributed, and act over the intended temperature range with tolerable distortion forces. Lastly, the contact could optionally be improved by a subsequent localized heating process.

BRIEF DESCRIPTION OF THE DRAWINGS

Further optional particulars and features of the present invention result from the description below of preferred exemplary embodiments, which are schematically illustrated in the figures.

DETAILED DESCRIPTION OF EXAMPLE EMBODIMENTS

Figure 1:
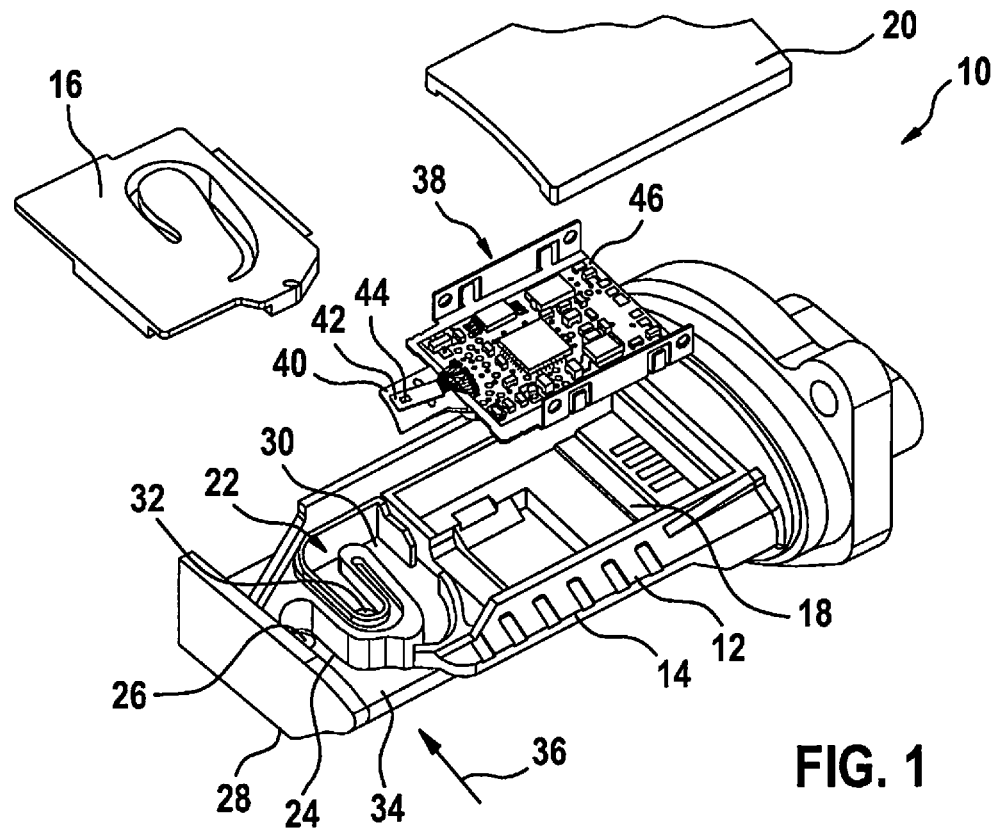
FIG. 1 shows a perspective view of a sensor.

FIG. 1 shows a perspective view of a sensor 10 for determining a parameter of a fluid medium. Sensor 10 is designed as a hot film air mass flow meter, and includes a sensor housing 12, designed as a plug-in sensor, which may plugged into a flow tube, for example, in particular an intake tract of an internal combustion engine. Sensor housing 12 includes a housing body 14, a measuring channel cover 16, an electronics compartment 18, and an electronics compartment cover 20 for closing the electronics compartment 18. A channel structure 22 is formed in housing body 16. Channel structure 22 includes a main channel 24 which opens into a main flow outlet 26, for example on bottom side 28 in relation to the illustration of sensor housing 12 in FIG. 1, and a bypass or measuring channel 30 which branches off from main channel 24 and which opens into a bypass or measuring channel outlet 32, which may be separate or may have an integrated design. As the result of channel structure 22, a representative quantity of the fluid medium may flow through an inlet opening 34, which in the inserted state points opposite from a main flow direction 36 of the fluid medium at the location of the sensor housing 12.

Figure 2:
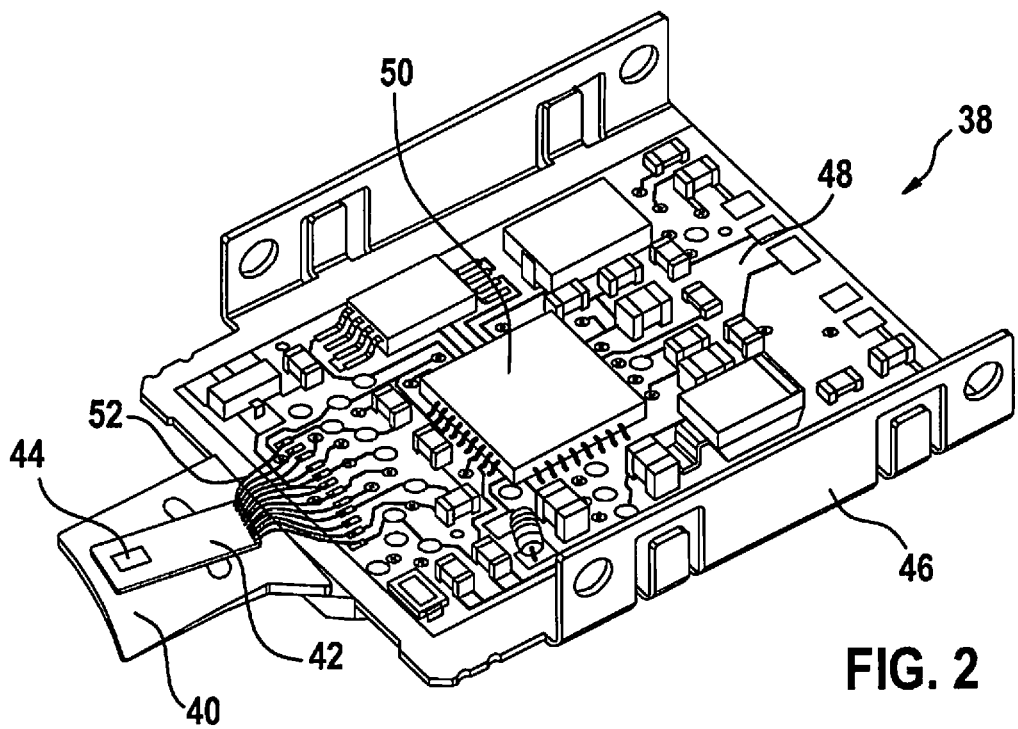
FIG. 2 shows an enlarged view of an electronic module of the sensor.

FIG. 2 shows an enlarged illustration of an electronic module 38 of sensor 10. A sensor carrier 40 protrudes into measuring channel 30 in an inserted state of electronic module 38. A sensor chip 42 is embedded in this sensor carrier 40 in such a way that the fluid medium may flow over a micromechanical sensor diaphragm 44, which is designed as a sensor area of sensor chip 42. Sensor carrier 40 together with sensor chip 42 is an integral part of electronic module 38. Electronic module 38 also includes a bent base plate 46, and a circuit board 48 mounted, for example glued, thereon, including a control and evaluation circuit 50. Sensor chip 42 is electrically connected to control and evaluation circuit 50 via electrical connections 52, designed here as wire bonding. Resulting electronic module 38 is introduced, for example glued, into electronics compartment 18 of housing body 14, which is a fixed integral part of sensor housing 12. Sensor carrier 40 protrudes into channel structure 22. Electronics compartment 18 is subsequently closed by electronics compartment cover 20.

Figure 3:
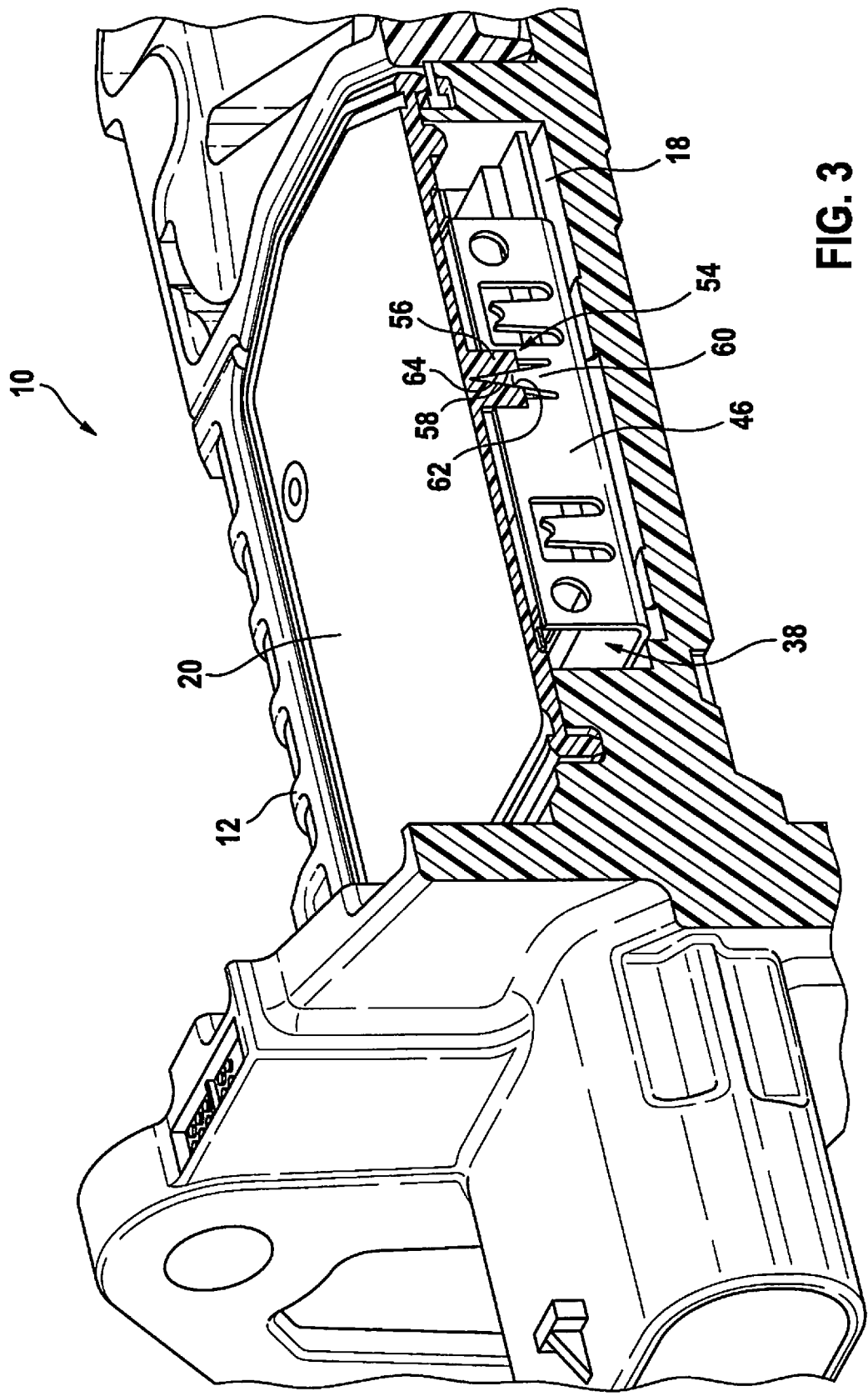
FIG. 3 shows a cross-sectional view of a sensor according to a first specific embodiment of the present invention.

FIG. 3 shows a cross-sectional view of a sensor 10 according to a first specific embodiment of the present invention. Electronics compartment cover 20 has electrically conductive properties at least in part. For example, electronics compartment cover 20 is made of an electrically conductive material such as electrically conductive plastic. Electronic module 38 is connected to an interior 54 of electronics compartment cover 20, as described in greater detail below. Thus, base plate 46 is electrically conductively connected to interior 54 of electronics compartment cover 20. This may be achieved, for example, by electronics compartment cover 20 including a projection 56. Projection 56 is provided with a hole 58. Hole 58 has a conical design, and tapers in the direction of electronics compartment cover 20. The design of electronics compartment cover 20 together with projection 56 and hole 58 may be achieved, for example, in that electronics compartment cover 20 is made of plastic, and hole 58 is formed by introducing a support pin into the injection mold and injection-molding the plastic around the support pin.

Base plate 46 includes a contact pin 60 that protrudes from same. Contact pin 60 is situated at a location of base plate 46 that is provided to be oppositely situated from projection 56. As shown in FIG. 3, contact pin 60 is likewise conical, i.e., designed as a flat cone, namely, as an integral part of a metallic punched part, and tapers in a direction away from the base plate. A diameter of contact pin 60 is greater than or equal to a diameter of hole 58. During the joining process, i.e., during assembly of electronics compartment cover 20 on sensor housing 12, contact pin 60 now cuts into hole 58 of electronics compartment cover 20. Since the diameter of contact pin 60 is larger than the diameter of hole 58, contact pin 60 scores an injection-molded skin, i.e., surface 62, of electronics compartment cover 20. Accordingly, base plate 46 is connected to interior 54 of electronics compartment cover 20, combined with an at least partial material removal of surface 62 of electronics compartment cover 20. More precisely, electronic module 46 is electrically conductively connected to an interior 64 of projection 56 with the aid of contact pin 60. As a result, a contact having a preferably low contact resistance is established, and base plate 46 is securely electrically conductively connected to interior 54 of electronics compartment cover 20. Contact pin 60 is shorter than projection 56. Therefore, the contact pin does not penetrate through electronics compartment cover 20. Alternatively, contact pin 60 and hole 58 may have a cylindrical design.

Figure 4:
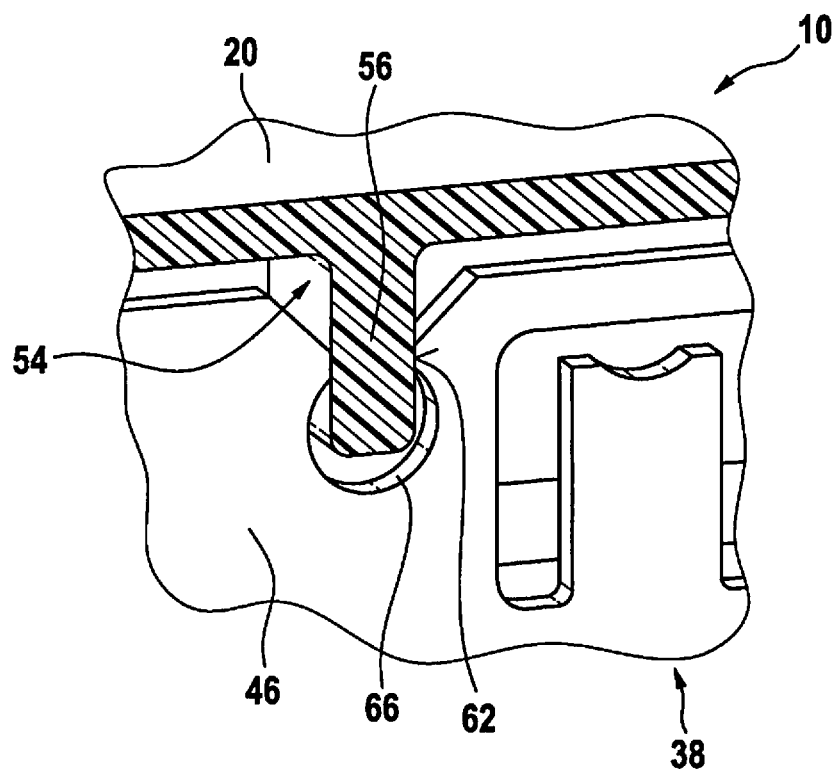
FIG. 4 vshows a cross-sectional view of a sensor according to a second specific embodiment of the present invention.

FIG. 4 shows a cross-sectional view of a sensor 10 according to a second specific embodiment of the present invention. Only the differences from the first specific embodiment are described below, and identical components are provided with the same reference numerals. The same as in the first specific embodiment, electronics compartment cover 20 includes a projection 56. Projection 56 has a tab-shaped design, and in contrast to the first specific embodiment does not include a hole 58. Base plate 46 includes a groove 66. A width of groove 66 is less than or equal to a width of projection 56. In other words, groove 66 is as wide as or narrower than projection 56. During assembly of electronics compartment cover 20 on sensor housing 12, projection 56 into groove 66 is now contacted on base plate 46 with the aid of a press or crimp connection. Since the edge of groove 66 has comparatively sharp edges, base plate 46 scores the outside of projection 56. This results in a partial material removal of surface 62 of electronics compartment cover 20 in the area of projection 56. A contact having a preferably low contact resistance is thus established, and base plate 46 is securely electrically conductively connected to interior 54 of electronics compartment cover 20.

Figure 5:
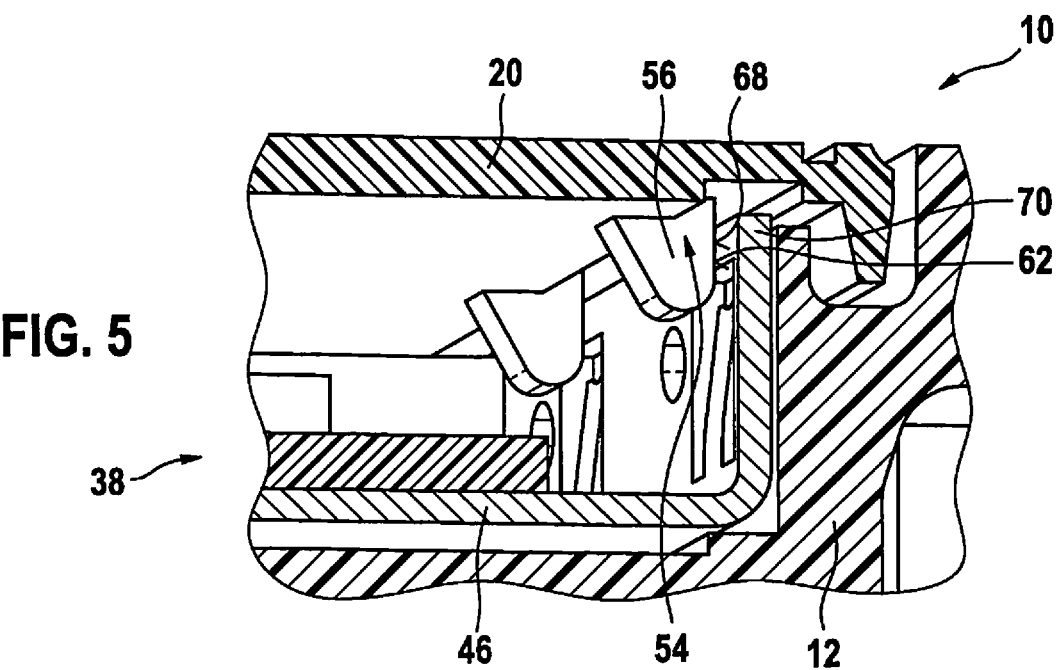
FIG. 5 shows a cross-sectional view of a sensor according to a third specific embodiment of the present invention.

FIG. 5 shows a cross-sectional view of a sensor 10 according to a third specific embodiment of the present invention. Only the differences from the first specific embodiment are described below, and identical components are provided with the same reference numerals. In sensor 10 of the third specific embodiment, projection 56 of electronics compartment cover 20 is wider than in the second specific embodiment, and has a side surface 68 which in a mounted state faces or is opposite from a sharp-edged punching edge 70 of base plate 46. During assembly of electronics compartment cover 20 on sensor housing 12, a partial material removal of surface 62 of electronics compartment cover 20 results due to punching edge 70 of base plate 46 scoring side surface 68. A contact having a preferably low contact resistance is thus established, and base plate 46 is securely electrically conductively connected to interior 54 of electronics compartment cover 20.

Figure 6:
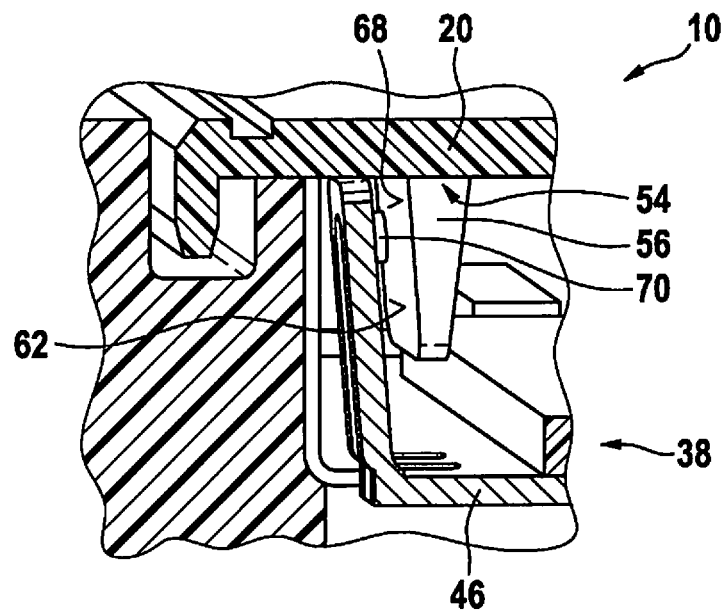
FIG. 6 shows a cross-sectional view of a sensor according to a fourth specific embodiment of the present invention.

FIG. 6 shows a cross-sectional view of a sensor 10 according to a fourth specific embodiment of the present invention. Only the differences from the first specific embodiment are described below, and identical components are provided with the same reference numerals. In sensor 10 of the fourth specific embodiment, projection 56 is longer than projection 56 in the third specific embodiment. Projection 56 is situated in such a way that a spring-elastic connection of electronics compartment cover 20 to punching edge 70 of base plate 46 results during assembly. Punching edge 70 is hereby pushed slightly outwardly from projection 56. During assembly of electronics compartment cover 20 on sensor housing 12, a partial material removal of surface 62 of electronics compartment cover 20 results due to sharp-edged punching edge 70 of base plate 46 scoring side surface 68, and the surface of the elastic spring connection of base plate 46 is optionally to be designed locally in such a way that a material removal may take place on cover 62 due to a locally increased surface roughness. A contact having a preferably low contact resistance is thus established, and base plate 46 is securely electrically conductively connected to interior 54 of electronics compartment cover 20.

Figure 7:
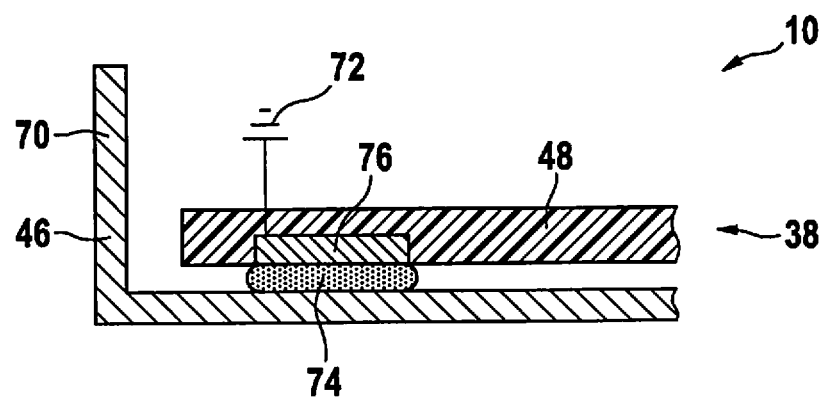
FIG. 7 shows a side view of an electronic module of the sensor.

FIG. 7 shows a side view of electronic module 38, which may be used in one of the specific embodiments described above. Base plate 46 is set at a fixed potential 72. For example, base plate 46 is connected to fixed potential 72 with the aid of an electrically conductive adhesive 74. Fixed electrical potential 72 may be, for example, a ground contact 76 of circuit board 48.

Figure 8:
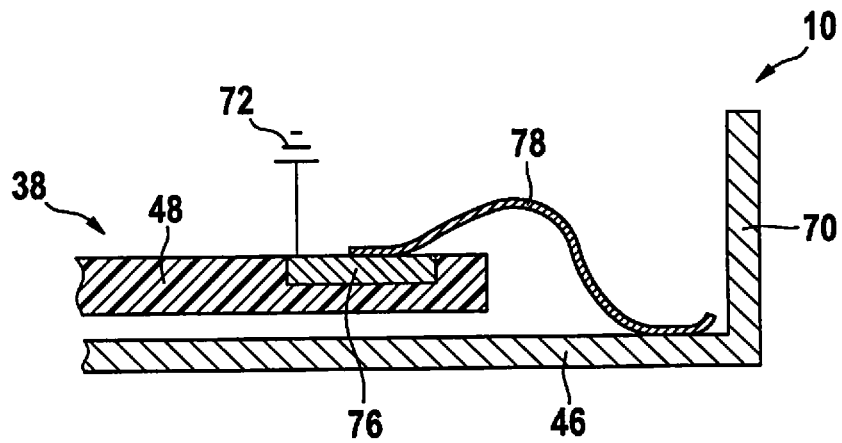
FIG. 8 shows a side view of the electronic module of the sensor.

FIG. 8 shows a side view of electronic module 38, which may be used in one of the specific embodiments described above. Here as well, base plate 46 is connected to fixed potential 72. The connection of base plate 46 to fixed potential 72 takes place with the aid of wire bonding 78.

Figure 9:
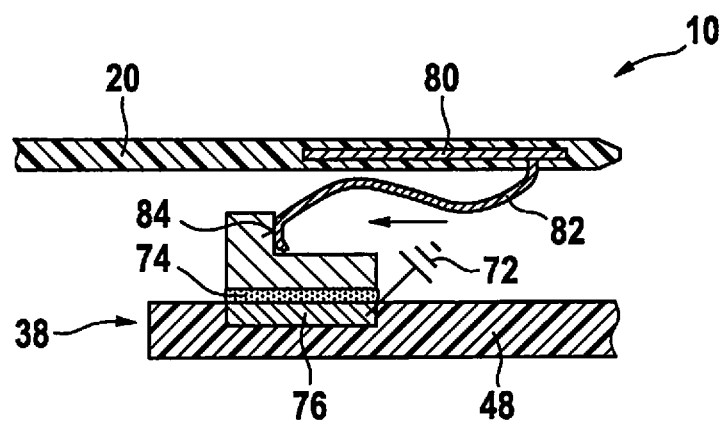
FIG. 9 shows a cross-sectional view of a sensor according to a fifth specific embodiment.

FIG. 9 shows a cross-sectional view of a sensor 10 according to a fifth specific embodiment of the present invention. Only the differences from the first specific embodiment are described below, and identical components are provided with the same reference numerals. In sensor 10 of the fifth specific embodiment, electronics compartment cover 20 includes in its interior 54 an insert component 80 made of an electrically conductive material. Insert component 80 is made of metal, for example. Insert component 80 is electrically conductively connected to electronic module 38. For example, insert component 80 is electrically conductively connected to electronic module 38 with the aid of an elastic contact 82, such as a so-called S spring. The connection of insert component 80 to elastic contact 82 may be established in that they are already joined together during the manufacture of electronics compartment cover 20, or insert component 80 is extrusion-coated and a portion of surface 62 is subsequently removed so that elastic contact 82 may be contacted with insert component 80. Elastic contact 82 may be oriented essentially horizontally, i.e., in parallel to electronics compartment cover 20 or to base plate 46, and connected to a stop surface 84 which is made of an electrically conductive material and which in turn is connected to ground contact 76 with the aid of an electrically conductive adhesive 74.

Figure 10:
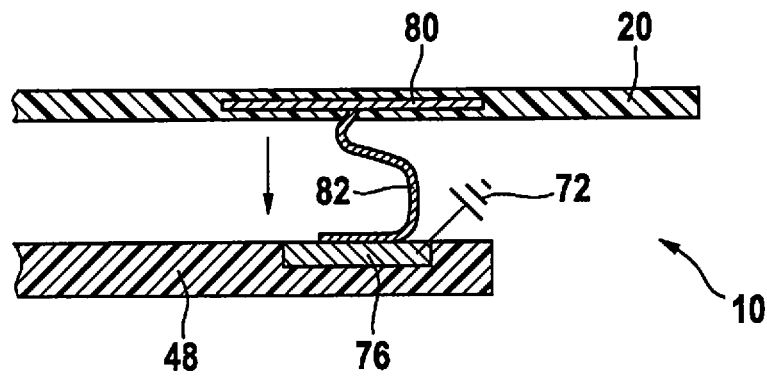
FIG. 10 shows a cross-sectional view of a sensor according to a sixth specific embodiment.

FIG. 10 shows a cross-sectional view of a sensor 10 according to a sixth specific embodiment of the present invention. Only the differences from the fifth specific embodiment are described below, and identical components are provided with the same reference numerals. In sensor 10 of the sixth specific embodiment, the fifth specific embodiment was resorted to. The difference is that elastic contact 82 is oriented vertically, i.e., perpendicularly with respect to electronics compartment cover 20 or to base plate 46, and is connected directly to ground contact 76.

What is claimed is:

1. A sensor for determining at least one parameter of a fluid medium flowing through a measuring channel, the sensor comprising:
   an electronic module;
   an electrically conductive base plate on which the electronic module is supported;
   a sensor chip connected to the electronic module and that is configured to determine the parameter of the fluid medium when the sensor chip is situated in the measuring channel; and
   a plug-in sensor housing that is introduced or introducible into a flow tube, in which the measuring channel is formed, and that includes:

an electronics compartment; and an electrically conductive electronics compartment cover closing the electronics compartment in which closed electronics compartment the base plate and the electronic module supported on the base plate are accommodated, with the electronic module being arranged between the base plate and the electrically conductive electronics compartment cover, wherein the electrically conductive base plate cuts into and is thereby electrically conductively connected to an interior of the electrically conductive electronics compartment cover.

2. The sensor as recited in claim 1, wherein the sensor is for determining an intake air mass flow of an internal combustion engine.

3. The sensor as recited in claim 1, wherein the base plate is set at a fixed potential.

4. The sensor as recited in claim 3, wherein the base plate is connected to the fixed potential (i) with the aid of an electrically conductive adhesive, or (ii) with the aid of wire bonding.

5. The sensor as recited in claim 1, wherein the electrically conductive connection of the base plate to the interior of the electronics compartment cover is by a tight fit of the base plate into the interior of the electronics compartment cover formed by a step of cutting a region of the base plate into a region of the interior of the electronics compartment cover, thereby stripping away material of a surface of the interior of the electronics compartment cover in the region of the interior of the electronics compartment cover, the material of the interior of the electronics compartment cover immediately surrounding the region of the interior of the electronics compartment cover thereby tightly surrounding the region of the base plate that cut into the region of the interior of the electronics compartment cover.

6. The sensor as recited in claim 5, wherein the base plate includes a contact pin that is electrically conductively connected to the interior of the electronics compartment cover.

7. The sensor as recited in claim 5, wherein the electronics compartment cover has a projection, the base plate being electrically conductively connected to an interior of the projection.

8. A method of forming a sensor for determining at least one parameter of a fluid medium flowing through a measuring channel, the method comprising:

supporting an electronic module on an electrically conductive base plate;

a sensor chip connected to the electronic module and that is configured to determine the parameter of the fluid medium when the sensor chip is situated in the measuring channel; and inserting the base plate, with the electronic module supported thereon, into an electronics compartment of a plug-in sensor housing that is introducible into a flow tube, in which flow tube the measuring channel is formed; and closing the electronics compartment with an electrically conductive electronics compartment cover, so that the electronic module is arranged between the base plate and the electrically conductive electronics compartment cover, wherein the closing includes cutting a region of the base plate into a region of an interior of the electronics compartment cover, thereby stripping away material of a surface of the interior of the electronics compartment cover in the region of the interior of the electronics compartment cover into which the base plate is cut, and thereby electrically conductively connecting the base plate to the electronics compartment cover.

* * * * *